(12) United States Patent
Pai

(10) Patent No.: US 6,966,510 B2
(45) Date of Patent: Nov. 22, 2005

(54) ELECTRIC ROTARY GRATER

(76) Inventor: Chung-Jen Pai, 1F, No. 83, Lane 26, Chung Hsiao Street, Chung Ho, Taipei Hsien (TW)

( * ) Notice: Subject to any disclaimer, the term of this patent is extended or adjusted under 35 U.S.C. 154(b) by 0 days.

(21) Appl. No.: 10/834,938

(22) Filed: Apr. 30, 2004

(65) Prior Publication Data

US 2005/0040265 A1 Feb. 24, 2005

(30) Foreign Application Priority Data

Aug. 19, 2003 (TW) .............................. 92214997 U

(51) Int. Cl.⁷ .......................... A47J 43/00; A47J 42/00
(52) U.S. Cl. .................. 241/169.1; 241/95; 241/168; 241/169
(58) Field of Search ..................... 241/95, 168, 169, 241/169.1

(56) References Cited

U.S. PATENT DOCUMENTS 3,642,045 A * 2/1972 Buvelot .................. 241/169.1
6,412,717 B1 * 7/2002 Menelaou ................ 241/169.1
6,520,436 B1 * 2/2003 Herren ...................... 241/169
6,830,205 B2 * 12/2004 Wang ..................... 241/169.1
6,830,206 B2 * 12/2004 Yang ...................... 241/169.1

* cited by examiner

Primary Examiner—Derris H. Banks
Assistant Examiner—Jason Y. Pahng
(74) Attorney, Agent, or Firm—Troxell Law Office, PLLC

(57) ABSTRACT

An electric rotary grater including an external cylinder and a roller being sheathed into the external cylinder and having a stirring plate connected to a blocking edge of the external cylinder. A chamber is defined each on both sides of the stirring plate which is connected to a grater disc having a plurality of grater holes. A power device having a power source disposed in a housing, and a pillar groove transversally disposed outside the housing into which the stirring plate is inserted and a housing pillar on both sides of the pillar groove. A transmission device being connected to the power device and having a motor, a retardation mechanism and a press switch in the housing. A top cover presses on a driven set assembly to make planet gears of the retardation mechanism run in idle and the housing and shell to rotate and thus driving the roller to rotate.

10 Claims, 4 Drawing Sheets

ELECTRIC ROTARY GRATER

BACKGROUND OF THE INVENTION

1. Field of the Invention

The present invention relates to a grater, more particular to an electric rotary grater.

2. Description of the Related Art

In western cuisines, chunks of cheese or chocolate are generally grated into powder and spread onto food to give better flavors to the food. The common graters usually have grater holes stamped out from a piece of metal plate, and the food is held by a hand and grated back and forth on the grater into powder. However, such manual method is not applicable for producing a large quantity of powder.

Therefore, grater manufacturers started developing electric graters to grate cheese or chocolate into powder in a more efficient and quicker way. The "KRUPS" branded cheese grater is an example of such electric grater. However, the shortcoming of an electric grater resides on that the opening of the feeder is too small, and food must be sliced first before being put into the feeder for the grating, and thus it can only produce limited quantity of powder. In addition, the pressing board of the grater uses the principle of torque for its operation. The palm of a housewife is usually small, which makes the handling difficult and tiresome. Moreover, if the pressing board is not operated with care, it may clamp and hurt a user's hand, which bother users very much.

SUMMARY OF THE INVENTION

In view of the foregoing shortcomings, the inventor of the present invention based on years of experience on the kitchenware and the spirit of improving the product to overcome the shortcomings of the prior-art grater to conduct extensive researches and experiments, and finally invented the electric rotary grater in accordance with the invention.

The primary objective of the present invention is to provide an electric grater that quickly grates chucks of food into powder with fun. Both hands can operate the grater, thus the user will not feel tired. Furthermore, the power and transmission devices are not in direct contact with the food thus requiring no cleaning after the grating and extending the life of its use. Further, the blade section at the top of the stirring plate of the roller can precut the food, so that the chucks of food can fall into the chambers on both sides, and can overcome the shortcoming of having a small opening of the food feeder for grating a large quantity of food. The grater disc is installed inside the external cylinder and will not be touched by users accidentally to assure the safety of its use. The present invention is definitely a great idea for products of this type.

The secondary objective of the present invention is to provide an electric rotary grater, wherein the transmission device is coupled to a relay sleeve and the driving device is covered; a pipe channel is disposed transversally outside the relay sleeve; a groove wall is defined therein for receiving the insertion of the pillar groove and defining the transmission, and the stirring plate is inserted into a pipe channel and the pressing pillars on both sides are extended into the chamber, so that the relay sleeve can be pulled out from the housing.

DETAILED DESCRIPTION OF THE PREFERRED EMBODIMENTS

Figure 1:
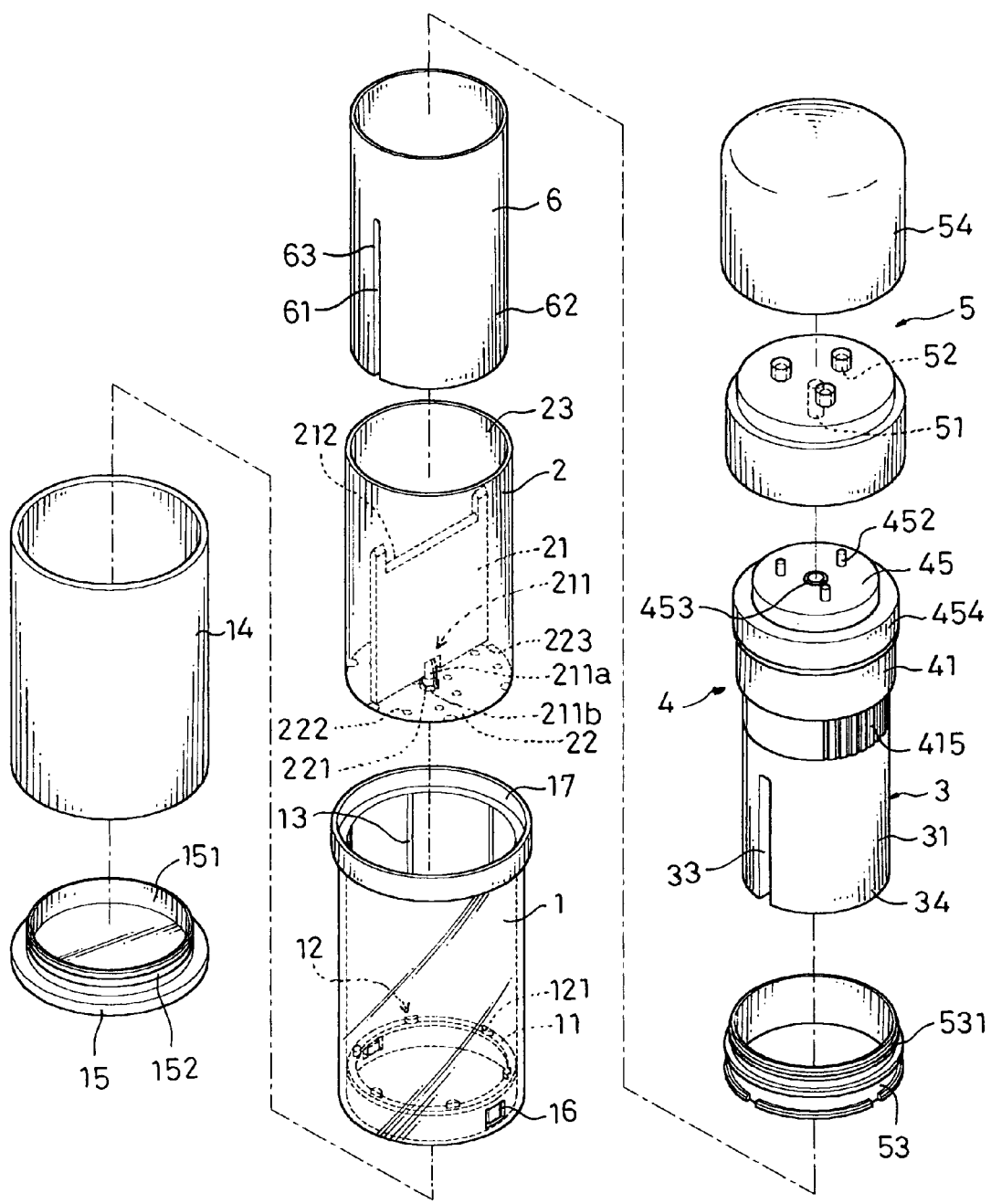
FIG. 1 is an exploded view of the electric rotary grater of the present invention respectively.
Figure 2:
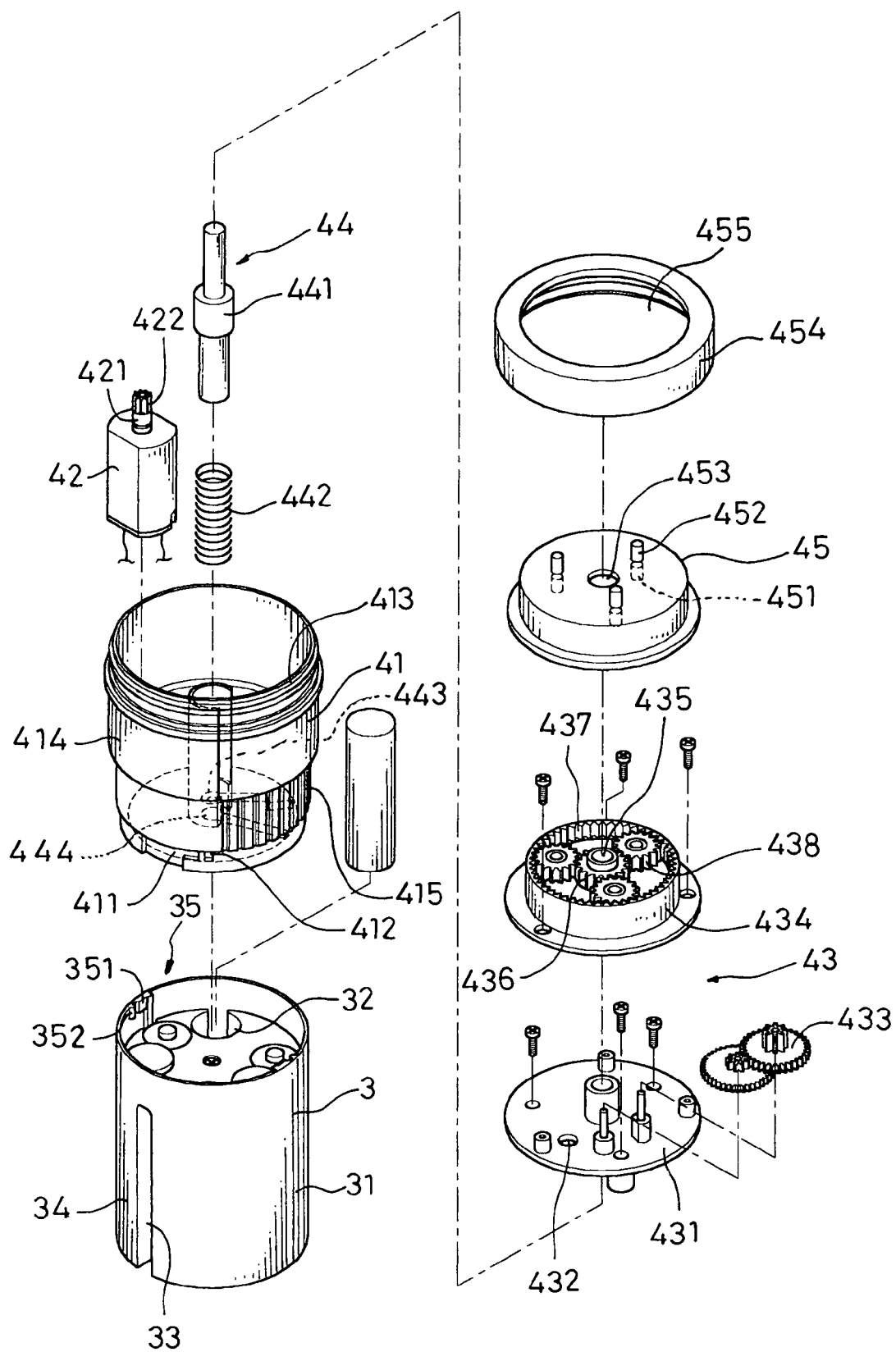
FIG. 2 is an exploded view of the power device and the transmission device of the present invention.
Figure 3:
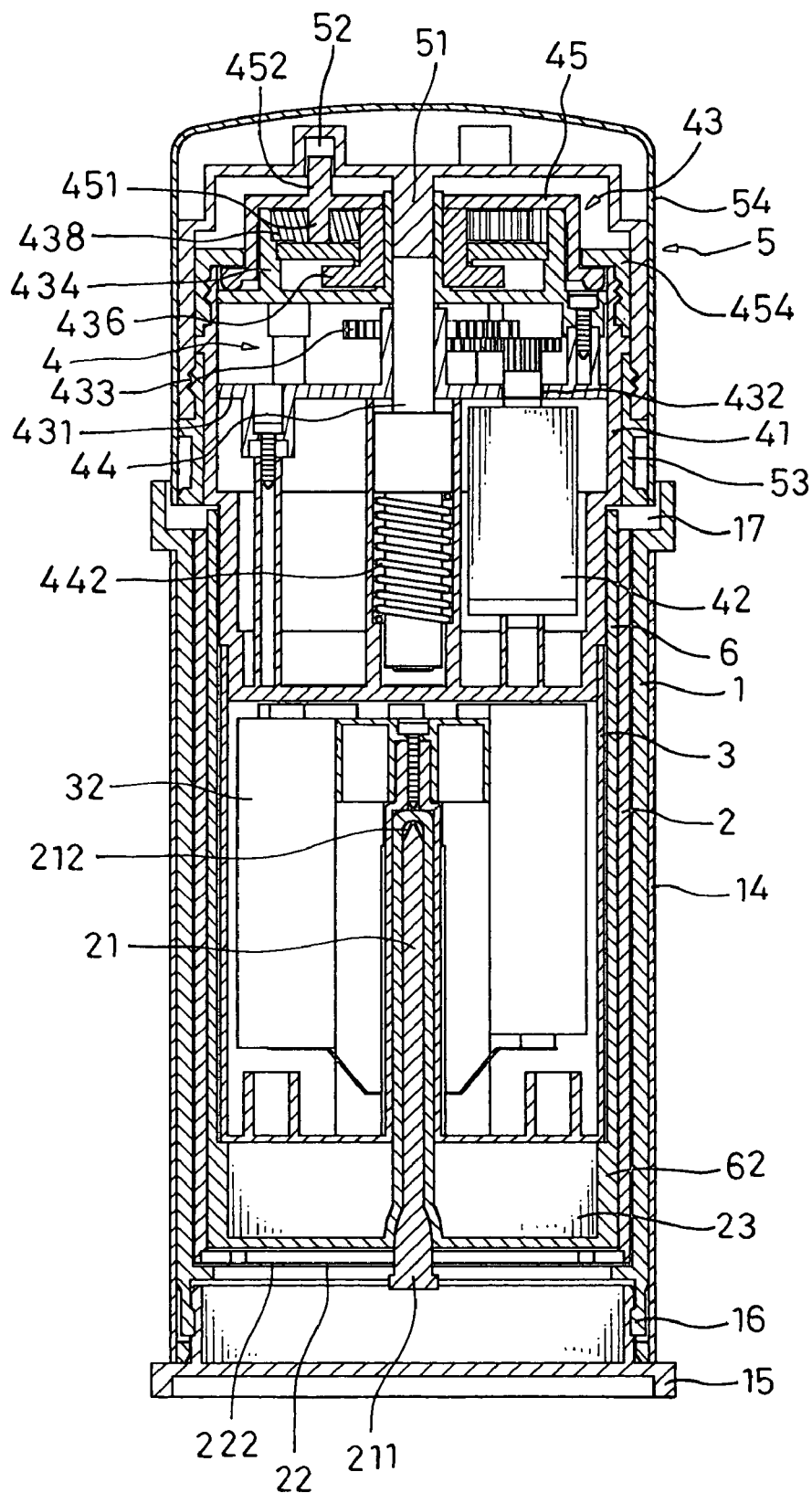
FIG. 3 is a cross-sectional view of the electric rotary grater of the present invention.

Refer to FIGS. 1 to 3 for the grater of the present invention, which comprises an external cylinder 1, a roller 2, a power device 3, a transmission device 4 and a top cover 5.

The external cylinder 1 is a hollow cylinder having a blocking edge 11, a positioning mechanism protruded from the bottom of an inner wall of the external cylinder 1 as shown in FIG. 1 and a plurality of tenons 12 protrude from the blocking edge 11 for coupling with the grooves 223 at the periphery of a grater disc 22. The grate disc 22 is fixed onto the bottom of the external cylinder 1. To reduce the friction between the inner walls of the external cylinder 1 and the roller 2, a plurality of transversal ribs 13 are built on the inner wall, so that the roller 2 can rotate smoother. In addition, a metal pipe such as an external stainless steel pipe is sheathed onto the exterior of the external cylinder 1 to enhance the external texture of the grater of the present invention. Further, a bottom chassis 15 seals the bottom fo the external cylinder 1 to prevent any remained powder on the grater disc 22 from falling off, and the bottom chassis is latched with at least two hooks 16. Further, a blocking ring 17 is protruded from the top of the external cylinder 1 to facilitate users to hold the grater, so that the grater according to the present invention will not slip away from the user's hand.

The roller 2 has a size corresponding to the internal diameter of the external cylinder 1 and a section of a stirring plate 21 transversally disposed therein. A fixture 211 is protruded from the center of the bottom of the stirring plate 21. For example, an axle rod 211a of a central open groove having a protruded tenon on its ends can be expanded or contracted resiliently to connect an axle hole 221 at the center of a grater disc 22. A plurality of protruded grater holes 222 are formed on the surface of the grater disc 22 for grating chunks of food into powder. In addition, a plurality of grooves 223 at its periphery are connected to a latch tenon 121 such that the grater disc 22 can be mounted onto the bottom of the external cylinder 1. Further, the stirring plate 21 is mainly used for providing the connection to the power device 3, so that the stirring plate rotates as the roller 2 rotates, and the two chambers 23 isolated by the stirring plate 21 can be used for accommodating the chunks of food. Further, a sharp blade section 212 is disposed at the top of the stirring plate 21 for precutting the larger chunks of food in order to fit and fall into the chambers 23.

The power device 3 provides the power supply to the transmission device 4 and comprises a battery base 32 with a size smaller than the circular housing 31 of the roller 2 for accommodating a battery and a transversal pillar groove 33 disposed at the exterior for connecting the foregoing stirring plate, and a pillar 34 disposed on both sides to be inserted into the chamber 23 and rotated as the housing 31 rotates. A connecting mechanism 35 such as a screw-and nut connection or a latch connection of the transmission device 4 is disposed at the top of the housing 31 as shown in the figure, and the connecting mechanism 35 is comprised of an inverted L-shaped guiding rib 351 and a latch protrusion 352 on its side.

The transmission device 4 comprises a motor 42, a retardation mechanism 43 and a press switch 44 in a stairway-like housing 41, so that when the press switch 44 is pressed, a drive set assembly 45 at the utmost top is driven to rotate. A guiding groove 411 and a latch groove 412 are formed at the lower periphery of the housing 41 corresponding to the guiding rib 351 and the latch protrusion 352 for pivotally coupling with each other, and the contact point disposed on the bottom is used for supplying an electric power from the power device 3 to the motor 42.

Refer to FIG. 2. When a press rod 441 of the press switch 44 is pressed to compress a resilient member 42 and connect two contact brackets 443, 44 disposed at the bottom of the housing 41 for an electric connection, a primary gear 442 of an output axle of the motor 42 rotates to drive a retardation mechanism 43 to rotate accordingly. The retardation mechanism 43 is mounted onto a partition board 431 inside the housing 41 and has a board opening 432 for allowing the primary gear 433 to be protruded and engaged with at least one retarding gears 433. The retarding gear 433 further engages with a sun gear 436 at a central axle pipe 435 in a base 434 at its top, and the top edge of the press rod 441 passes into the axle pipe 435. The sun gear 436 and the circular gear 437 between the inner walls of the base 4343 are engaged to at least two planet gears 438, such that when the sun gear 436 rotates, each planet 438 also rotates along the circular gear 437. The driving seat assembly 45 is disposed at the upper section of the base 434, and at least two internal axle rods 451 protruded from the inner wall connect to the corresponding planet gear 438, and at least two external axle rods 452 are protruded form the top surface to facilitate the connection with a top cover 5 which will be described later. A disc hole 453 is disposed at the center of the driving set assembly 45 for receiving the axle pipe 435. At last, an inwardly rotated cover 454 is coupled to threads 413 at the top of the housing 41 by screwing, and the cover hole 455 is used for protruding the external axle rods 452, and thus completing the assembly fo the transmission device 4.

The top cover 5 is coupled to the driving set assembly 45, and a press tenon 51 and a connecting hole 52 are built respectively on the corresponding axle pipe 435 and the external axle pillar 452 for being connected with each other. In the meantime, an externally rotated cover 53 is sheathed into the bottom of the transmission device 4 and coupled with the top cover 5 by the screw threads 531, so that the top cover 5 and the transmission device 4 are integrally coupled. To improve the artistic appearance of the top cover 5, a metal sleeve 54 is sheathed onto the top cover 5 to match with the external pipe 14.

Further, since the power device 3 provides the power supply, when the roller 2 rotates, it is not necessary to rinse any remaining powder attached on the shell 31 with water, and thus the invention can avoid possible damages to the transmission device 4 and the power device 3. A relay sleeve 6 is sheathed into a stairway surface 414 of the housing 41, and a plurality of grooves 415 are disposed transversally on the stairway surface 414 for facilitating the pulling out of the relay sleeve 6. A transversal pipe groove 61 is disposed substantially at the center of the bottom of the relay sleeve 6, so that a press pillar 62 is formed on both sides for connecting the stirring plate 21 and extending the press pillar 62 into the chamber 23, and the pillar groove 33 of the housing 31 is connected to the groove wall 63 inside the pipe groove 61, such that the relay sleeve 6 can rotate synchronously with the power device 3.

Figure 4:
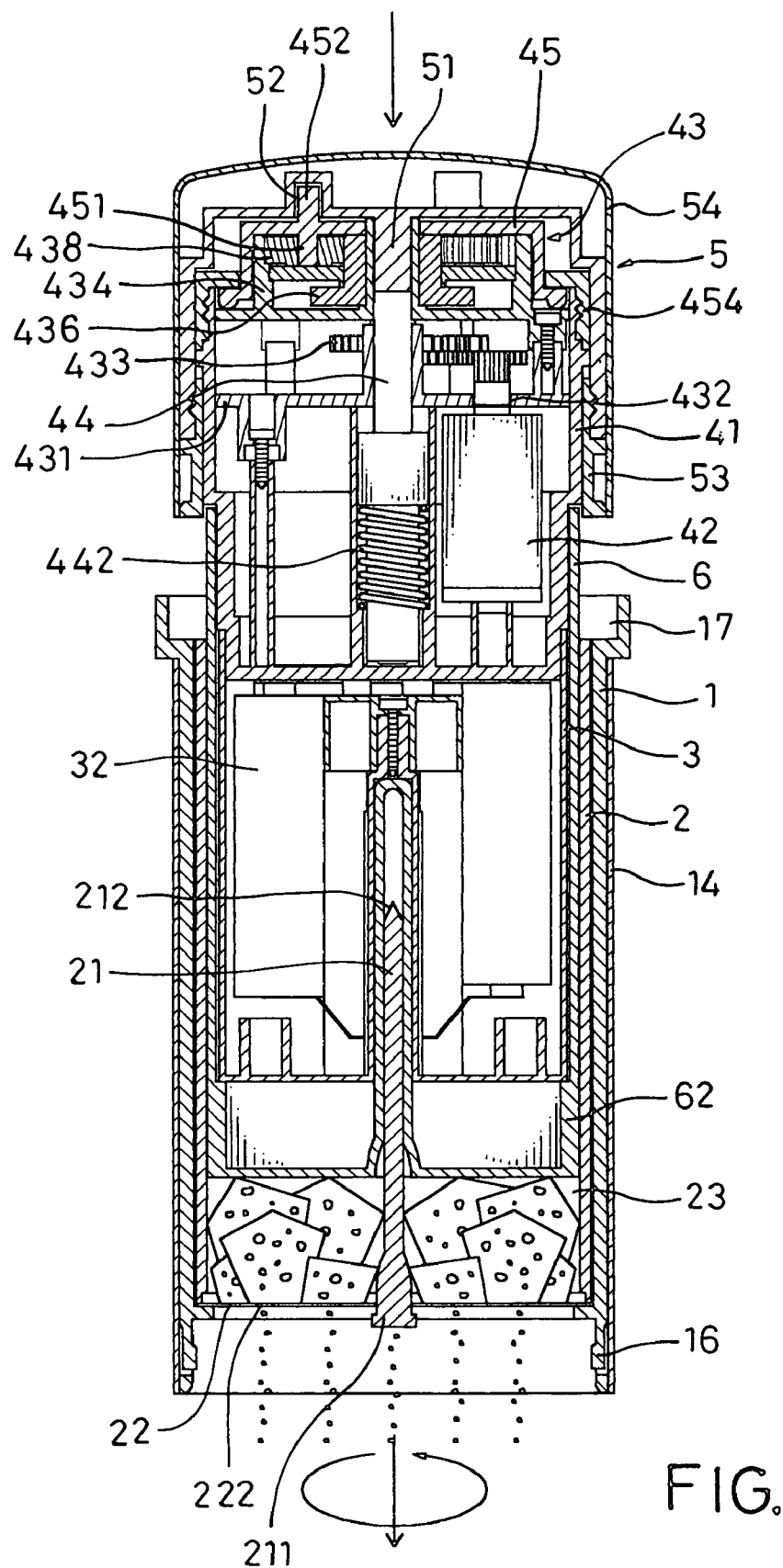
FIG. 4 is a cross-sectional view of the electric rotary grater when it is in use according to the present invention.

Refer to FIG. 4. When the grater according to the present invention is in use, a user only needs to press the top cover 5 in order to drive the press tenon 51 to press the press switch 44 for an electric connection and start the motor 42 and drive the primary gear 422 to rotate. At least one retardation gear 433 and a sun gear 436 are driven to rotate accordingly. Since the top cover 5 is pressed by a palm, therefore the driving set assembly 45 will not rotate, and each planet gear 438 will be rotated in idle and makes the engaged circular gear 437 to rotate, and thus driving the base 434, base housing 41, housing shell 3, relay sleeve 6, and roller 2 to rotate synchronously in the clockwise direction. The chucks of food such as cheese in the chamber 23 of the roller 2 are squeezed by the two press pillar 62 and stirred by the stirring plate 21 and grated along the circumference of the grater disc. The grated powder will pass through the grater holes 222 and fall out from the external cylinder 1 to complete the grating operation. If the grater is not in use anymore, the user just needs to release the top cover 5 to return the press switch back to its original position in order to disconnect the power.

Therefore, the implementation of the present invention quickly grates chucks of food into powder with fun. Both hands can operate the grater, and thus the user will not feel tired. Furthermore, the power and transmission devices are not in direct contact with the food and thus requiring no cleaning after the grating and extending the life of its use. Further, the blade section at the top of the stirring plate of the roller can precut the food, so that the chucks of food can fall into the chambers on both sides, and can overcome the shortcoming of having a small opening of the food feeder for grating a large quantity of food. The grater disc is installed inside the external cylinder and will not be touched by users accidentally to assure the safety of its use. The present invention is definitely a great idea for the products of this sort.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electric rotary grater, comprising:

an external cylinder, having a blocking edge protruded from the bottom of an inner wall of said external cylinder;

a roller, being sheathed into said external cylinder and having a stirring plate located therein, such that a chamber being defined on each side of both sides of the stirring plate and a grater disc having a plurality of grater holes being coupled to a connecting member disposed at the center of the bottom of said stirring plate and having a positioning mechanism between said roller and a blocking edge for mounting said stirring plate onto said blocking edge;

a power device, having a power source disposed in a housing, and a pillar groove transversally disposed outside said housing and a housing pillar on both sides of the pillar groove and being extended into said chamber, the stirring plate is inserted into the pillar groove, a transmission device, being coupled to said power device and having a motor, a retardation mechanism and a press switch in said housing, such that a driven set assembly at the top being driven by a sun gear and at least two planet gears of said retardation mechanism to revolve; and a top cover, being disposed on the top of said driven set assembly and a tenon being protruded from an inner wall at the top;

wherein, said tenon selectively pressing said press switch providing an electric connection driving said motor and operating said retardation mechanism, and said top cover selectively pressing said driven set assembly making said planet gears to run in idle and said housing and shell to rotate and driving said roller to rotate.

2. The electric rotary grater of claim 1, wherein said transmission device is coupled to a relay sleeve and covers said power device, and a pipe groove is disposed on the exterior of said relay sleeve and a groove wall formed therein for receiving said pillar groove of said shell to constitute a link, and said pillar groove is coupled with said stirring plate, and said press pillars on both sides extend into said chamber for pulling said relay sleeve from said base housing.

3. The electric rotary grater of claim 1, wherein said positioning device has a plurality of latch tenons protruded from said blocking edge and a plurality of grooves disposed at the periphery of said grater disc for coupling to said latch tenon.

4. The electric rotary grater of claim 1, wherein said external cylinder has a bottom chassis at its bottom.

5. The electric rotary grater of claim 1, wherein said stirring plate has a sharp blade section at its top.

6. The electric rotary grater of claim 1, wherein said external cylinder has a plurality of transversal ribs on an inner wall of said external cylinder.

7. The electric rotary grater of claim 1, wherein said press switch is coupled to a resilient member by a press rod, and two overlapped contact brackets are disposed at the bottom of said base housing under said press rod and the top of said base housing is accommodated in an axle pipe at the center of said base.

8. The electric rotary grater of claim 1, wherein said primary gear of said motor passes through a pattern board and engages with a retardation mechanism, and said retardation mechanism is comprises at least one retardation gear for engaging with said primary gear and further engaging a sun gear disposed at a central axle pipe of said base, and said sun gear engages with at least two planet gears disposed between inner walls of a circular gear, and at least two internal axle rods protruded from the inner wall of the top of a driving set assembly are coupled individually to said planet gears, and at least two external axle rods protruded from an external wall at the top of said driving set assembly are inserted individually into a connecting hole of said top cover; and an inwardly rotated cover is coupled to the top of said housing to prevent said driving set assembly from falling off.

9. The electric rotary grater of claim 1 further comprising an outwardly rotated cover being coupled to the bottom of said housing to integrally couple with said top cover.

10. The electric rotary grater of claim 1, wherein said external cylinder and said top cover are coupled individually to an external metal pipe and a metal sleeve.

* * * * *